United States Patent Office 3,396,225
Patented Aug. 6, 1968

3,396,225
INSECTICIDAL USE OF EXO,EXO-4,8-DICHLORO-2-THIATRICYCLO[3.2.1.0$^{3,7}$]OCTANE 2,2-DIOXIDE
Thomas A. Magee, Mentor, Ohio, assignor to Diamond Shamrock Corporation, a corporation of Delaware
No Drawing. Filed Apr. 3, 1967, Ser. No. 627,869
3 Claims. (Cl. 424—275)

ABSTRACT OF THE DISCLOSURE

Insecticidal activity of the compound exo,exo-4,8-dichloro-2-thiatricyclo[3.2.1.0$^{3,7}$]octane 2,2-dioxide, is disclosed.

BACKGROUND OF THE INVENTION

This invention relates to insecticidal compositions containing the compound, and to the killing and/or controlling of insect pests by using the compound, exo,exo-4,8-dichloro-2-thiatricyclo[3.2.1.0$^{3,7}$]octane-2,2-dioxide. This compound corresponds to the following structure:

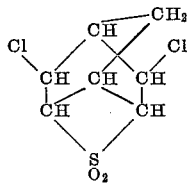

This compound has been disclosed in the Journal of Organic Chemistry, vol. 31, pp. 1679–1682, and more specifically p. 1681, column 2. Also, the preparation and identification of the compound has been shown in this article although in the article the compound is named under a differing system of nomenclature and hence has been identified therein as exo,exo-3,5-dichloro-8-thiatricyclo[2.2.1.1$^{2,6}$]octane-8,8-dioxide. However, the article does not contain any teaching of a utility for this compound.

It has now been found that this compound exhibits broad insecticidal activity, e.g., by killing beetles, aphids, and houseflies, and exhibits particularly outstanding ability for the killing of houseflies. This capability with respect to houseflies is exhibited not only through direct spray contact with sprayable insecticidal compositions containing the compound, but also through contact by houseflies with lingering, residual amounts of such compositions retained on objects which have been subjected to spray application.

SUMMARY OF THE INVENTION

Broadly this invention relates to insecticidal compositions containing the compound exo,exo-4,8-dichloro-2-thiatricyclo[3.2.1.0$^{3,7}$]octane 2,2-dioxide.

Additionally this invention relates to the method of killing insects by contacting such insects with an insecticidal amount of such compound and further relates to the method of protecting plants from insects by applying to the plants an insecticidal amount of such compound.

DESCRIPTION OF THE PREFERRED EMBODIMENTS

The compound used in this invention can be prepared in accordance with the method set forth in the Journal of Organic Chemistry, vol. 31, p. 1681 (1966). As discussed hereinbefore, the procedure taught in this publication prepares the compound corresponding to the structure presented hereinabove, although in the article the compound is named under a different system of nomenclature than is used in the disclosure of this invention.

In using the compound as an insecticide, i.e., for the killing and/or controlling of insect pests such as by protecting plants from insects through the application to the plants of an insecticidal amount of the compound, it can be applied as such or it can be extended with a liquid or solid diluent. The compound disclosed herein can, for example, be combined or formulated into suitable compositions for spraying or drenching, or, if desired, formulated as an emulsifiable concentrate. Alternatively, the compound can, of course, be formulated into appropriate use compositions by mixing a toxic amount thereof with a conditioning agent of the kind used and referred to in the art of pest control as an adjuvant.

Insecticidal compositions embodying the compound disclosed herein can be prepared in the form of solids or liquids. Solid compositions, preferably in the form of wettable powders, are compounded to give homogeneous free-flowing powders by mixing the active ingredient with finely divided solids, Attaclays, diatomaceous earth, synthetic fine silica or flours such as walnut shell, redwood, soybean, cotton seed flour or other solid conditioning agents or carriers of the kind conventionally employed in preparing pest control compositions in solid or liquid form.

Even more preferable among solid compositions, in some instances, are granules or pellets when the application is primarily to the soil. Granules may be prepared by impregnating granular diluents such as granular Attaclay or may be made by first extending powdered solid with powdered diluent and subsequently granulating. Pellets are made by extruding moistened, powdered mixtures under high pressure through dies.

Liquid compositions containing the compound disclosed in this invention can be prepared by mixing the active ingredient with a suitable liquid diluent medium. The resulting composition can be in the form of either a solution or suspension of the active ingredient.

The insecticidal compositions of the invention, whether in the form of solids or liquids, for most applications may also include a surface-active agent of the kind sometimes referred to in the art as a wetting, dispersing or emulsifying agent. These agents, which will be referred to hereinafter more simply as surface-active agents, cause the compositions to be easily dispersed in water to give aqueous sprays.

The surface-active agents employed can be of the anionic, cationic, or nonionic type and include, for example, sodium and potassium oleate, the amine salts of oleic acids such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkyl naphthalene sodium sulfonate and other wetting, dispersing and emulsifying agents such as those listed in articles by McCutcheon in 'Soap and Chemical Specialties," vol. 31, Nos. 7–10 (1955) including, for example, the material known as Triton X–155 (100% alkylaryl polyether alcohol, U.S. Patent No. 2,504,064).

Generally, the surface-active agent will not comprise more than about 5% to 15% by weight of the composition, depending upon the particular surface-active agent, the system in which it is placed, and the result desired; in certain compositions, the percentage will be 1% or less. Usually, the minimum lower concentration will be 0.1%.

The active compound is, of course, applied in an amount sufficient to exert the desired insecticidal action. The amount of the active ingredient present in the compositions as actually applied will vary with the manner of application, the particular insect pest for which control is sought, the purposes for which the application is being made, and like variables. In general, however, the insecticidal compositions will contain from about 0.5% to 99% by weight of the active ingredient.

Fertilizer materials, herbicidal agents, and other pest control agents such as bactericides, nematocides and fungicides can be included, if desired, in the compositions of the invention if the material is applied as a systemic insecticide, i.e., the material is applied to the soil and by systemic action through the plant is effective against insect infestation of the plant.

In order that those skilled in the art may more completely understand the present invention and the preferred methods by which the same may be carried into effect, the following specific examples are offered:

Example 1.—Housefly spray test

This test determines the inescticidal activity of the test compound exo,exo-4,8-dichloro-2-thiatricyclo[3.2.1.0$^{3,7}$]-octane 2,2-dioxide against adult houseflies, *Musca domestica*.

The formulation for this test contains 0.1 g. of test chemical; 4.0 ml. acetone, 2.0 ml. stock emulsifier solution (0.5% Triton X-155 in water by volume) and 94.0 mls. distilled water. The concentration of toxicant in this formulation is 1000 p.p.m., with the lower concentrations being obtained by diluting the formulation with distilled water.

Cages consisting of cylindrical screens 1½ inches in diameter by 4-inches long are fabricated from 20-mesh stainless steel screening. One end is closed with a size D polyurethane foam tube plug. Ten adult houseflies (male and female), anesthetized with carbon dioxide, are counted into each cage, and the open end is then closed with a second foam plug. The cages are inserted into a wire stand mounted on the turntable in a spray hood and these insects are sprayed along with the other items described above. The flies are supplied a dextrose solution by draping a paper wick over the outside of the screen cylinder. They are able to feed and drink by passing their probosci through the openings in the screen. Mortality data are recorded three days after treatment. Results of insecticidal activity are given in the following table:

Concentration p.p.m.:      Percent mortality
500 ------------------------------------- 100
128 ------------------------------------- 100
32 -------------------------------------- 100
16 -------------------------------------- 60

Example 2.—Red-banded leaf roller leaf spray test

This test determines the insecticidal activity of the test compound exo,exo-4,8-dichloro-2-thiatricyclo[3.2.1.0$^{3,7}$]-octane 2,2-dioxide against the red-banded leaf roller, *Argyrotaenia velutinana*.

The test species is composed of newly hatched larvae of the red-banded leaf roller. Paired fully expanded primary leaves excised from Pinto bean plants are maintained in a suitable container and sprayed with 50 mls. of the test formulation in a turntable spray hood. This test formulation contains 0.1 g. chemical, 4.0 mls. acetone, 2.0 mls. stock emulsifier solution (0.5% Triton X-155 in water by volume), and 94.0 mls. distilled water. The concentration of toxicant in this formulation is 1000 parts per million. Lower concentrations of toxicant are obtained by diluting the formulation with distilled water.

After the chemical deposit on the leaves is dry, the paired leaves are separated. One leaf is placed onto 1.5% water agar (15 mls. per 100 mm. polystyrene disposable Petri dish). Ten newly hatched red-banded leaf roller larvae are transferred to the leaf and the Petri dish is covered. These are held at 72° F. for three days when mortality is determined. Results of insecticidal activity are given in the following table:

Concentration p.p.m.:      Percent mortality
1000 ------------------------------------ 100
500 ------------------------------------- 90

Example 3.—Mexican bean beetle leaf spray test

This test determines the insecticidal activity of the compound exo,exo - 4,8 - dichloro - 2 - thiatricyclo[3.2.1.0$^{3,7}$] octane 2,2-dioxide against the Mexican bean beetle (*Epilachna varivestis*).

The test specie is composed of one-day-old larvae of the Mexican bean beetle. Paired fully expanded primary leaves excised from Pinto bean plants are maintained in a suitable container and sprayed with 50 mls. of the test formulation in a turntable spray hood. This test formulation contains 0.1 g. chemical, 4.0 mls. acetone, 2.0 mls. stock emulsifier solution (0.5% Triton X-155 in water by volume), and 94.0 mls. distilled water. The concentration of toxicant in this formulation is 1000 parts per million. Lower concentrations of toxicant are obtained by diluting the formulation with distilled water.

After the chemical deposit on the leaves is dry, the paired leaves are separated. One leaf is placed onto 1.5% water agar (15 mls. per 100 mm. polystyrene disposable Petri dish), and is infested with 10 one-day-old Mexican bean beetle larvae. These are held at 77° F. for three days when mortality is determined. Results of insecticidal activity are given in the following table:

Concentration, p.p.m.:      Percent mortality
1000 ------------------------------------ 100
500 ------------------------------------- 90

Example 4.—Red spider mite test

The test determines the insecticidal activity of the test compound against the red spider mite, *Tetranychus sp.* A test formulation containing 0.1 g. of the test chemical, 4.0 mls. acetone, 2.0 mls. stock emulsifier solution (0.5% Triton X-155 in water by volume), and 94.0 mls. distilled water is prepared. This formulation is used either for a soil drench treatment alone, or for a spray application alone.

The stock culture of mites is maintained on Scarlet runner bean foliage. Approximately 18 to 24 hours before testing, mites are transferred from the stock culture by pieces of infested leaves which are placed on the primary leaves of two Lima bean plants (var. Sieva) grown in 2½-inch pots. As leaf fragments dry, the mites migrate to the uninfested leaves. Immediately before drenching, or before spray application, the leaf fragments are removed from the foliage.

In the soil drench treatment, 11.2 mls. of the formulation is applied to the freshly infested plants, which is equivalent to a dosage of the test chemical of 32 pounds per acre. For spray application 50 mls. of the test formulation (1000 p.p.m.) is used; also, a lower concentration of toxicant (500 p.p.m.) is obtained for the spray application by diluting the test formulation with distilled water. These formulations are sprayed onto the plants by means of a DeVilbiss paint spray gun (Type CH), calibrated to deliver 45 mls. water in 30 seconds at 30 pounds air pressure per square inch, while the plants are being rotated on a turntable in a hood.

Two to three days after treatment, two of the four leaves treated are examined under a binocular stereoscopic microscope and the mortality determined. Using this procedure, the following results are obtained:

| Dosage | | Percent Mortality | |
|---|---|---|---|
| Soil Drench, lbs./acre | Foliage Spray, p.p.m. | Mite Spray | Mite Systemic |
| 32 | | | 82 |
| | 1,000 | 100 | |
| | 500 | 50 | |

Example 5.—Bean aphid test

This test determines the insecticidal activity of the test compound against the bean aphid *Aphis fabae*, either by a soil drench alone, or by a foliage spray alone. For the foliage spray, a basic test formulation containing 0.1 g.

of the test chemical, 4.0 mls. acetone, 2.0 mls. stock emulsifier solution (0.5% Triton X-155 in water by volume), and 94.0 mls. distilled water is prepared. The basic soil drench test formulation contains 0.4 g. of the test compound, 8 mls. acetone, 4 mls. of the stock emulsifier solution, and 187.6 mls. distilled water. Lower concentrations of toxicant from this soil drench formulation, as well as from the spray application formulation, are obtained by diluting the formulation with distilled water.

The bean aphid is cultured on nasturtium plants var. Tall Single, no attempt being made to select insects of a given age in these tests. One day before a scheduled evaluation, nasturtiums growing in 2½-inch clay pots are thinned to one plant per pot. These test plants are then infested by excising heavily infested leaves from the colony and hanging these leaves in the crotch of the test plants. As the leaves desiccate overnight, the aphids migrate to the test plants, and populations of 100 to 200 aphids per plant can easily be attained.

In the drench treatment, the test formulation is applied to the soil of the freshly infested plants; an application of 11.2 mls. of the 2000 p.p.m. soil drench test formulation, or 22.4 mg. per 2½-inch pot, is equivalent to a dosage of the test chemical of 64 pounds per acre. For spray application, 50 mls. of the foliage spray test formulation (1000 p.p.m.) is sprayed by means of a DeVilbiss paint spray gun (Type CH), calibrated to deliver 45 mls. water in 30 seconds at 30 pounds air pressure per square inch, while the plants are being rotated on a turntable in a hood.

Following spray treatment, a set of two Dixie Cups is prepared for each spray treated test plant; one squat 5-oz. wax-coated cup and one squat 7-oz. plastic-coated cup. A ⅛-inch strip of paper is cut from each cup from the rim to slightly past the center of the bottom. In use, a 5-oz. cup is placed into a 7-oz. cup, the slits in the cups are aligned, this assembly is slipped around the stem of the sprayed infested plant, rested on the pot, and the 5-oz. cup is then rotated 180° in a horizontal plane.

For the test plants used in the soil drench, and after the formulations are applied to the soil of these plants with the aid of an Accropet, the infested nasturtium foliage is enclosed in a cage composed of: (1) a squat 5-oz. Dixie Cup with a rectangular notch (⅛" x ½") cut vertically from the rim down; and, (2) the lid of a 9-cm. Petri dish. The Dixie Cup is held at an angle, resting on the rim of the pot; the nasturtium stem is fitted into the rectangular notch; and the Petri dish lid is then carefully placed onto the Dixie Cup thereby enclosing the infested foliage. The only exit available to the aphids is through the small notch in the Dixie Cup at the base of the plant stem.

The pot-plant-Dixie Cup test units for both the foliage spray and the soil drench treatments are then stood under fluorescent lights in a tray and given bottom watering for the duration of the test. Dead aphids fall into the Dixie Cup assemblies where they can easily be counted. Percentage mortality is determined one day after spraying and three days after soil drenching. Using this procedure, the following results are obtained:

| Dosage | | Percent Mortality | |
|---|---|---|---|
| Soil Drench, lbs./acre | Foliage Spray, p.p.m. | Aphid Spray | Aphid Systemic |
|  | 1,000 | 100 |  |
|  | 500 | 100 |  |
| 32 |  |  | 100 |
| 16 |  |  | 86 |

It is to be understood that, although the invention has been described with specific reference to particular embodiments thereof, it is not to be so limited, since changes and alterations therein may be made which are within the full intended scope of this invention as defined by the appended claims.

I claim:
1. The method of killing insect pests which comprises contacting said pests with a pesticidal amount of exo, exo - 4,8 - dichloro - 2 - thiatricyclo[3.2.1.0$^{3,7}$]octane2,2-dioxide.
2. The method of claim 1 wherein said insects are houseflies.
3. The method of protecting plants from insect pests which comprises applying to said plants an insecticidal amount of exo,exo-4,8-dichloro-2-thiatricyclo[3.2.1.0.$^{3,7}$] octane 2,2-dioxide.

References Cited

Jour. Organic Chemistry, vol. 31 pp. 1679–1682 (1966).

ALBERT T. MEYERS, *Primary Examiner.*

S. FRIEDMAN, *Assistant Examiner.*